United States Patent [19]

Boursse et al.

[11] Patent Number: 4,735,191
[45] Date of Patent: Apr. 5, 1988

[54] MUSICAL TEAKETTLE APPARATUS

[75] Inventors: Pierre G. Boursse, Balboa Island; Bill Grau, Orange; Anton Gattiher, Playa Del Rey, all of Calif.

[73] Assignee: Musikettle, Inc., Anaheim, Calif.

[21] Appl. No.: 11,652

[22] Filed: Feb. 5, 1987

Related U.S. Application Data

[63] Continuation of Ser. No. 682,305, Dec. 17, 1984, abandoned.

[51] Int. Cl.⁴ .................... A47J 27/212; H01H 35/24
[52] U.S. Cl. ................................. 126/388; 200/83 N; 340/621; 340/626
[58] Field of Search .............. 340/626, 692, 611; 84/1.03, 101; 200/61.58 R, 81.9 R, 83 N; 116/67 R; 126/388

[56] References Cited

U.S. PATENT DOCUMENTS

| Re. 23,042 | 10/1948 | Upson | 200/83 N |
|---|---|---|---|
| 1,582,154 | 4/1926 | Zeiher et al. | 200/83 N |
| 2,669,643 | 2/1954 | Johnson | 116/103 X |
| 3,068,506 | 12/1962 | Oishei | 200/83 N |
| 3,226,528 | 12/1965 | Marten | 116/101 |
| 3,497,651 | 2/1970 | Blatter | 200/81.9 R |
| 3,517,692 | 6/1970 | Elrod | 340/626 |
| 4,393,365 | 7/1983 | Kondo et al. | 340/692 |
| 4,466,327 | 8/1984 | Hinton | 84/95 C |
| 4,472,069 | 9/1984 | Yamamoto | 84/1.03 |

FOREIGN PATENT DOCUMENTS

2909129  9/1980  Fed. Rep. of Germany ........ 99/342

Primary Examiner—Daniel M. Yasich
Attorney, Agent, or Firm—Leonard Tachner

[57] ABSTRACT

A device primarily for attachment to the spout of a teakettle for generating a musical signal in response to the vapor pressure of boiling water. A diaphragm distorts in response to the pressure and closes an electrical switch which applies battery voltage to a circuit in which a representation of a pre-selected tune is stored. The tune is applied to a piezoelectric speaker within a resonating housing to audibly signal the user that the water in the teakettle is boiling.

4 Claims, 2 Drawing Sheets

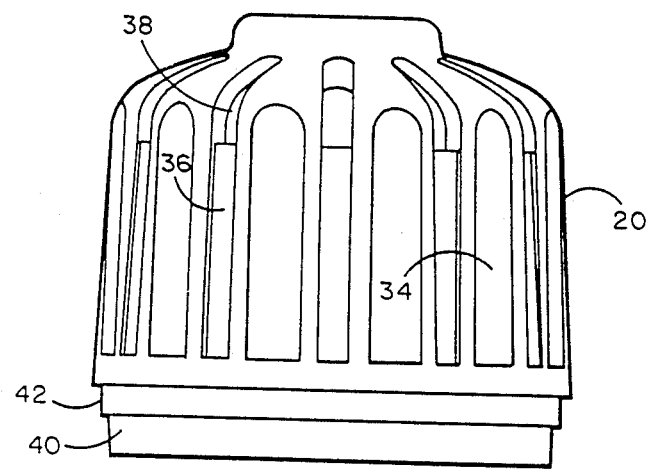
FIG. 3
FIG. 4
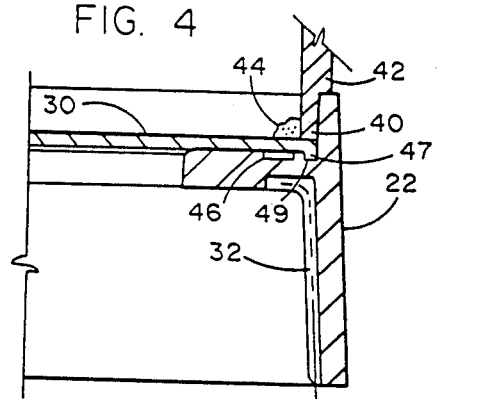
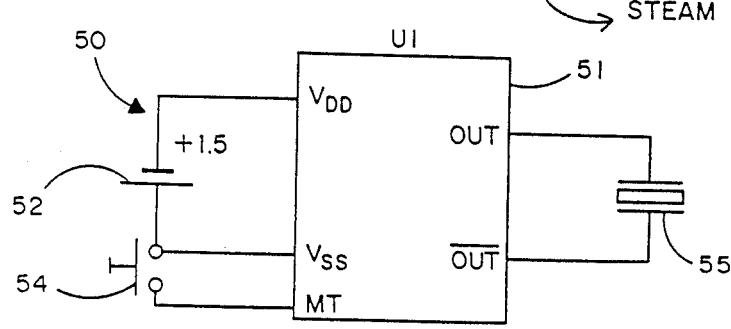
FIG. 5

MUSICAL TEAKETTLE APPARATUS

This is a continuation of application Ser. No. 682,305 filed Dec. 17, 1984, now abandoned.

BACKGROUND OF THE INVENTION

1. Field of the Invention

The present invention relates generally to a melody generating means responsive to vapor pressure and more particularly, to an apparatus primarily for attachment to the spout of a teakettle to signal the boiling of the water contained in the kettle by means of a melodious tune of virtually any complexity.

2. Prior Art

It is well-known that it is desirable to provide in a teakettle a means for signaling the boiling of water therein when the teakettle has been subjected to appropriate heat for a sufficient length of time. Such signaling devices typically comprise whistling devices which respond mechanically to the passage of high pressure steam through an aperture by creating a high pitch, shrill, whistle sound. Unfortunately, such whistle sounds are often unpleasantly high pitched and loud and therefore, extremely annoying.

Some attempts have been made in the prior art to improve upon the traditional teakettle whistle device. For example, in U.S. Pat. No. 2,630,776 to Lewis a teakettle device utilizes a plurality of different gauge reeds which vibrate at different frequencies in response to varying steam pressure to produce a chord of three notes. In U.S. Pat. No. 1,811,853 to Landman a kettle alarm is disclosed in which the pitch of the whistle can be varied by manually raising or lowering a portion of the structure. U.S. Pat. No. 3,916,818 to Barr et al discloses a steam whistle having two different pitches depending upon the steam pressure. U.S. Pat. No. 4,155,349 to Hudson discloses a variable intensity whistle in which the structure provides means for varying the offset of the apertures through which the steam flows in order to allow the user to manually change the intensity of the whistle of the kettle.

Unfortunately, none of the prior art known to the applicants discloses a teakettle device which responds to the steam pressure of boiling water by actually playing a tune, a melody, a song of any complexity of sufficient volume to alert the kettle user of the boiling condition of the water contained within the kettle and in a much more pleasant and attractive manner.

SUMMARY OF THE INVENTION

The present invention overcomes the noted disadvantages of the prior art by providing a device particularly adapted for connection to the spout of a teakettle and which responds to the vapor pressure of boiling water contained therein by generating a melody of approximately one-half to one minute in length with sufficient volume to alert the user to the condition of the boiling water in a manner which is soothing to the ear as well as fun and interesting to use. The invention comprises a melody producing device structured primarily to attach to the spout of a teakettle and having a base portion which is adapted to mate with the teakettle spout, and a housing which contains the electronic portion, that is, the portion which generates the melody in response to vapor pressure. The device utilizes the increased vapor pressure of boiling liquid directed against a diaphragm which in turn moves an actuator for closing a momentary switch in the electronic portion of the device. The switch connects a battery voltage to an integrated circuit in which is stored a digital representation of any desired melody of between one-half and one full minute in length.

Because of the novel configuration of the present invention a pleasant complex melody of virtually any selection may be employed without the use of complicated mechanical contrivances which are evident in the prior art for even the simple two or three note device. Furthermore, the user of the present invention may be notified of the boiling condition of the teakettle water without any annoying shrill sound of a conventional whistle. Furthermore, irrespective of the amount of water in the teakettle or the violence of the boiling action of the water contained therein, the signal is the same, the music is constant and repeats as long as the vapor pressure is available from the teakettle spout.

OBJECTS OF THE INVENTION

It is therefore a principal object of the present invention to provide a signaling device that is responsive to vapor pressure and is therefore especially useful on teakettles to indicate the boiling condition of the water, but which does so by producing a musical sound comprising any complex tune which can be played over a period of approximately 30 to 60 seconds.

It is an additional object of the present invention to provide a teakettle signaling device which obviates the annoying shrilll sound of the prior art by means of a low cost music generating device which uses the water vapor pressure to switch on a battery operated integrated circuit thereby avoiding complex mechanical contrivances of the prior art.

It is still an additional object of the present invention to provide a teakettle signaling device of simple structure which is readily connected to the spout of standard teakettles and which utilizes an integrated circuit chip responsive to the vapor pressure of the boiling water in the teakettle to play a tune at a sufficiently high volume to alert the user of the boiling condition of the water in the kettle.

BRIEF DESCRIPTION OF THE DRAWINGS

The aforementioned advantages and objects of the present invention as well as additional advantages and objects thereof shall hereinafter be more fully understood as a result of a detailed description of a preferred embodiment of the invention when taken in conjunction with the accompanying drawings in which:

FIG. 3 is an elevational view of the housing portion of the present invention;

FIG. 4 is a partial cross-sectional view of the base portion of the present invention; and FIG. 5 is a simple schematic of the electronics portion of the present invention.

DETAILED DESCRIPTION OF A PREFERRED EMBODIMENT

Figure 1:
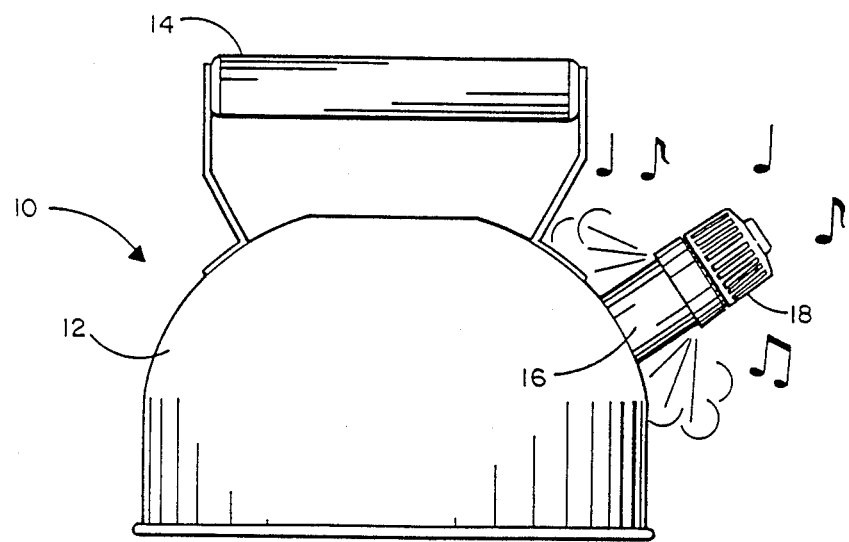
FIG. 1 is an elevational view of a typical teakettle employing the apparatus of the present invention.

Referring first to FIG. 1 there is shown a conventional teakettle 10 of the type having a container 12 typically of metal such as copper or aluminum, a handle 14 usually provided with a thermally non-conductive material to permit the user to lift the kettle after the water has boiled and a spout 16 through which water is poured from the teakettle after it is boiled and in through which water is poured in preparation for use of the kettle. Furthermore, in FIG. 1 there is shown at the tip of the kettle spout 16 the melody device 18 of the present invention which may be better understood by reference to the remaining figures of the application.

Figure 2:
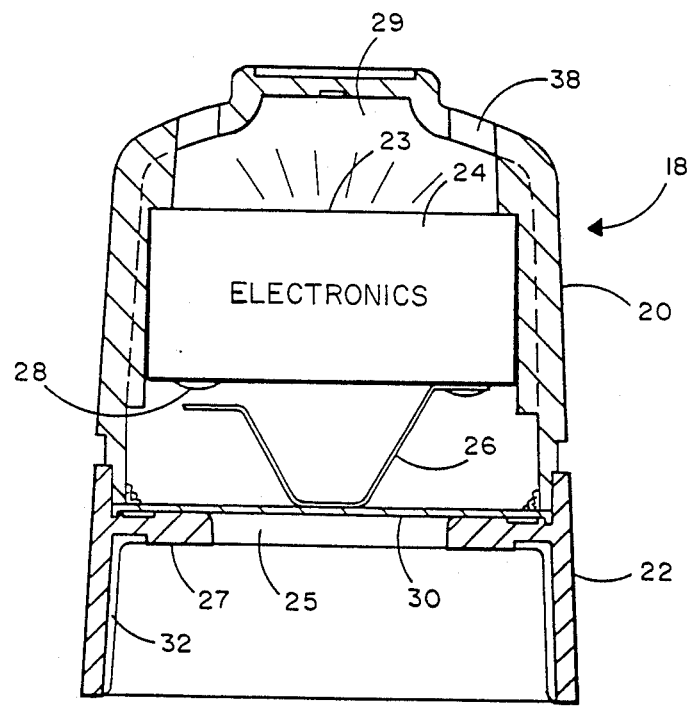
FIG. 2 is a cross sectional view of the apparatus of the present invention.

More specifically, as seen in FIGS. 2, 3 and 4, the melody device 18 of the present invention comprises a housing 20 and a base 22 as its principal mechanical components. The base is adapted to be readily connected in firm frictional engagement to the peripheral exterior of the spout 16. The base is also adapted to receive the housing 20 which, as shown in FIG. 2, encloses an electronics portion 24, the details of which shall be described hereinafter. The electronic portion 24 is designed to respond to the closure of a switch formed by an acutator 26 and a contact 28. The actuator 26 rests in a normally open position against a diaphragm 30 which is adhesively secured to the base 22 covering an interior aperture 25 formed within an annular platform 27.

In operation the housing and base portions are firmly affixed to one another in the configuration illustrated in FIG. 2 and the base portion is designed to firmly engage the spout of a teakettle. The steam pressure of the boiling water within the kettle exerts a force against the diaphragm 30 through the aperture 25 within the base thereby exerting an upwardly directed force against the actuator 26. As a result of the force upon actuator 26, the actuator rotates until it makes contact with contact 28 thereby closing a circuit which will be described hereinafter in conjunction with FIG. 5.

It will be seen hereinafter that the circuit of the electronics portion 24 is designed to generate a musical tune through a piezoelectric speaker which is contained in the upper portion or upper surface 23 of the electronics portion of the invention. The housing 20 of the invention is as seen in FIG. 3, designed to permit the sound generated through the piezoelectric speaker to emanate from the interior of the housing so as to produce an audible signal. More specifically, as seen in FIG. 3, the housing 20 comprises a plurality of indentations 34 and 36, but also a plurality of sound escape apertures 38 which are positioned collinear with indentations 36 and which extend along the housing wall above the position of the electronics portion 24 contained therein. In this manner, the open volume 29 within the housing above the electronic portion 24 acts as a resonating sound chamber which reinforces the sound generated by the electronics portion from the piezoelectric speaker and thereby permits a user to clearly hear the musical tune produced by the invention at a resonable distance in response to the boiling condition of the water.

The membrane 30 is, as seen in FIG. 4, adhesively secured to both the base 22 and the housing 20. It is secured to the base 22 by means of an adhesive which is applied to an adhesive groove 46 in the platform 27 of the base. It is also adhesively affixed to the housing 20, more specifically, to the base interface flange 40 extending from a step flange 42 of the housing 20 by means of a silicone adhesive 44. A lip 47 of the diaphragm is secured in a lip groove 49. In this manner diaphragm 30 is firmly affixed along its entire periphery to the base and housing whereby vapor pressure emanting from the teakettle spout and entering the base 22 will exert a force against the diaphragm and permit it to respond by moving the acutator 26 into electrical contact with contact 28.

Of course, those having skill in the art to which the present invention pertains will understand that the diaphragm 30 can be readily designed to respond to any selected vapor pressure and it is preferable to have it respond substantially to a vapor pressure occurring when water has just barely begun to boil to minimize the time required of the user to wait for the teakettle to have completed its function. Therefore a means for venting additional vapor pressure when the water is boiling at a greater level of intensity has been provided in the present invention in the form of a plurality of steam vents 32 seen best in FIGS. 2 and 4. As seen in FIG. 1, the steam actually exits the device of the present invention primarily at the lowermost edge of the base between the base and the spout 16.

The electronics portion 24 of the present invention is shown schematically in FIG. 5. The electronics 50 comprises an integrated circuit 51, a battery 52, a momentary switch 54 and a piezoelectric speaker 55. The integrated circuit 51 may be any one of a number of conventional and readily available commercial devices which produce a pre-selected musical tune in response to the application of a selected voltage to one of its terminals. In the presently preferred embodiment of the invention, integrated circuit 51 comprises a CMOS Model SVM-7902 melody CMOS device which is readily available from a number of manufacturers. Another such device for example which is manufactured by General Instruments Company is the Model 8429CDA integrated circuit which also produces selected melodies in response to the application of low voltage to a selected terminal.

In the presently preferred embodidment of FIG. 5, the selected integrated circuit 51 is designed to operate in response to a 1.5 volt DC input which may be provided by any one of a large number of conventional watch batteries. In the configuration of FIG. 5, for purposes of minimum volume requirements the 1.5 volt battery selected is of the selenium watch battery type which is readily available from a variety of manufacturers in various configurations and current ratings. The switch 54 of the present invention is a schematic representation of the combination of actuator 26 and electrical contact 28 of FIG. 2 and momentary connection of the actuator to the contact applies 1.5 volts to terminal MT of FIG. 5 which produces the analog musical signal at the terminals OUT and $\overline{\text{OUT}}$, which are in turn connected to piezoelectric speaker 55.

It will now be understood that what has been disclosed herein comprises a device for attachment to the spout of a teakettle for generating a musical signal in response to the vapor pressure of boiling water. A diaphragm distorts in response to the pressure and closes an electrical switch which applies battery voltage to a circuit in which a representation of a pre-selected tune is stored. The tune signal is applied to a piezoelectric speaker within a resonating housing to audibly signal the user that the water in the teakettle is boiling.

Those having ordinary skill in the art to which the present invention pertains will now, as a result of the teaching herein, perceive of various modifications and additions. However, all such modifications and additions are deemed to be within the scope of the invention which is to be limited only by the claims appended hereto.

We claim:

1. An improved apparatus of the type adapted to fit over the spout or to be integrated into the spout or other orifice of a teakettle and to respond to the vapor pressure of boiling liquid within the teakettle by generating an audible sound to warn the user of the boiling condition of the liquid, the improvement comprising:

means in the spout of the apparatus for storing an electrical representation of a selected audible signal; and actuator means mounted to a diaphragm and the storing means, said actuator means coacting with the diaphragm in said apparatus and responsive to said vapor pressure for applying a voltage of a power source to said storing means for generating said audible signal.

2. The improvement recited in claim 1 wherein said audible signal is a musical tune.

3. The improvement recited in claim 1 wherein said actuator means comprises a switch actuator, the diaphragm being flexible and positioned relative to said spout for axial distortion in response to said vapor pressure, said distortion being sufficient to at least momentarily depress said actuator for applying said voltage.

4. The improvement recited in claim 1 further comprising a housing for containing said storing means and said actuator means, said housing having an apertured chamber for resonating said audible sound; and a base member adapted to fit snugly over said spout and to provide a physical interface between said spout and said housing.

* * * * *